(12) United States Patent
Guilpain et al.

(10) Patent No.: US 7,504,043 B2
(45) Date of Patent: Mar. 17, 2009

(54) HYDROFLUOROCARBON-BASED COMPOSITION AND USE THEREOF

(75) Inventors: Gerard Guilpain, Brindas (FR); Laurent Caron, Sainte Foy les Lyon (FR)

(73) Assignee: Arkema France, Colombes (FR)

( * ) Notice: Subject to any disclaimer, the term of this patent is extended or adjusted under 35 U.S.C. 154(b) by 207 days.

(21) Appl. No.: 10/570,938

(22) PCT Filed: Sep. 2, 2004

(86) PCT No.: PCT/FR2004/002231

§ 371 (c)(1), (2), (4) Date: Dec. 22, 2006

(87) PCT Pub. No.: WO2005/028586

PCT Pub. Date: Mar. 31, 2005

(65) Prior Publication Data

US 2007/0187638 A1 Aug. 16, 2007

(30) Foreign Application Priority Data

Sep. 19, 2003 (FR) .................................. 03 11025

(51) Int. Cl.
*C09K 5/04* (2006.01)
*B08B 9/032* (2006.01)

(52) U.S. Cl. .............................. 252/67; 252/68; 252/69; 134/22.12; 134/22.11; 134/22.18

(58) Field of Classification Search .................. 252/67, 252/68, 69; 134/22.12, 22.11, 22.18
See application file for complete search history.

(56) References Cited

U.S. PATENT DOCUMENTS

| | | | |
|---|---|---|---|
| 5,097,667 A | | 3/1992 | Gramkow et al. |
| 5,709,092 A | * | 1/1998 | Shiflett .......................... 62/114 |
| 5,722,256 A | * | 3/1998 | Shiflett .......................... 62/502 |
| 6,187,219 B1 | * | 2/2001 | Omure et al. .................. 252/67 |
| 6,526,764 B1 | * | 3/2003 | Singh et al. ..................... 62/84 |
| 6,589,355 B1 | * | 7/2003 | Thomas et al. ................. 134/3 |
| 2002/0000534 A1 | * | 1/2002 | Richard et al. ................. 252/69 |
| 2002/0121623 A1 | * | 9/2002 | Singh et al. .................... 252/67 |
| 2003/0070722 A1 | | 4/2003 | Thomas et al. |
| 2006/0234896 A1 | * | 10/2006 | Thomas et al. ............... 510/407 |

FOREIGN PATENT DOCUMENTS

| | | |
|---|---|---|
| EP | 509673 A1 * | 10/1992 |
| EP | 0 536 940 | 4/1993 |
| EP | 0 979 855 | 2/2000 |
| EP | 1 072 850 | 1/2001 |
| GB | 2 269 004 | 1/1994 |
| JP | 08-100170 | 4/1996 |
| JP | 08 100170 | 4/1996 |
| WO | WO 00/29796 | 5/2000 |
| WO | WO01/74977 A2 * | 10/2001 |
| WO | WO 94/11459 | 5/2004 |

OTHER PUBLICATIONS

CAS reg. No. 420-46-2, Nov. 1984.*
CAS reg. No. 811-97-2, Nov. 1984.*
CAS reg. No. 354-33-6, Nov. 1984.*
CAS reg. No. 75-10-5, Nov. 1984.*
Arcaklioglu et al., "Thermodynamic analyses of refrigerant mixtures using artificial neural networks", Applied Energy (2004) 78, 219-230.*
Camporese et al., "Experimental evaluation of refrigerant mixtures as substitutes for CFC12 and R502", Int. J. Refrig. (1997), 20, 1, 22-31.*

* cited by examiner

Primary Examiner—Douglas McGinty
(74) Attorney, Agent, or Firm—Steven D. Boyd

(57) ABSTRACT

The invention relates to a hydrofluorocarbon (HFC)-based composition, to the use thereof in refrigeration and/or air conditioning and to a heat-transfer system containing same.

8 Claims, 1 Drawing Sheet

US 7,504,043 B2

HYDROFLUOROCARBON-BASED COMPOSITION AND USE THEREOF

FIELD OF THE INVENTION

A subject matter of the present invention is a composition based on HFCs (HydroFluoroCarbons), its use in refrigeration and/or air conditioning, and a heat transfer system comprising it.

BACKGROUND OF THE INVENTION

Heat transfer systems include in particular refrigerators, heat pumps and conditioned air systems.

In such devices, a refrigerant with a suitable boiling point is evaporated at low pressure, taking heat from a first surrounding medium (or zone). The vapor thus formed is then compressed by means of a compressor and subsequently passes into a condenser, in which it is converted to the liquid state, giving rise to a release of heat into a second surrounding zone. The liquid thus condensed subsequently moves through a pressure-reducing valve, at the outlet of which it is converted to a two-phase mixture of liquid and vapor, which is finally introduced into the evaporator, where the liquid is again evaporated at low pressure, which completes the cycle.

The mechanical energy required to ensure the compression of the vapor and the circulation of the fluid is provided by an electric motor or an internal combustion engine. As in any mechanical device, it is necessary for the moving parts to be suitably lubricated. The lubricants used form an integral part of the heat transfer system and condition both its performance and its lifetime by the maintenance over time of suitable lubrication.

In particular, the refrigerant, which is at each pass through the compressor in contact with the lubricant present on its moving parts, tends to carry away a certain amount thereof, which accompanies the refrigerant in its cycle and is thus found in the evaporator. In point of fact, the latter is generally brought to a low temperature, at which the viscosity of the lubricant is particularly high, so that there is a risk of lubricant accumulating in the evaporator and thus the lubricant is no longer able to return to the compressor, this return being described in the present text as "oil return".

Thus, if the oil return is inadequate, the amount of lubricant present on the moving parts of the compressor cannot be kept constant over time, which thus effects the satisfactory operation of said compressor and its lifetime.

It is therefore necessary to use a refrigerant/oil pair which is entirely compatible, in particular with regards to the oil return.

R-22 or monochlorodifluoromethane is a refrigerant of HCFC (HydroChloroFluoroCarbon) type widely used in heat transfer applications, including fixed air conditioning, commercial and industrial refrigeration, and heat pumps. There currently exist numerous heat transfer systems designed for R-22; the lubricants employed, as they are suitable for R-22, in particular as regards the oil return, are either mineral oils or alkylbenzene oils.

Although R-22 has a very low ozone depletion potential (hereinafter ODP), its use is, however, also subject to restrictions and novel products based on HFCs (HydroFluoroCarbons) have been developed which are particularly advantageous for the stratospheric ozone layer since HFCs exhibit a zero ODP.

Among these products, R-407C has in particular been developed for replacing R-22 in air conditioning applications. This product is a mixture combining R-32, R-125 and R-134a in the proportions of 23/25/52% by weight. R-32 is the usual name in the trade for difluoromethane, R-125 is pentafluoroethane and R-134a denotes 1,1,1,2-tetrafluoroethane. R-407C has thermodynamic properties which are very similar to those of R-22. For this reason, R-407C can be used in old systems designed to operate with R-22, thus making it possible to replace an HCFC fluid by an HFC fluid which is safer with regards to the stratospheric ozone layer in the context of a procedure for converting these old systems. The thermodynamic properties concerned are well known to a person skilled in the art and are in particular the refrigerating capacity, the coefficient of performance (or COP) and the condensation pressure.

The refrigerating capacity represents the refrigeration power available by virtue of the refrigerant, for a given compressor. In order to replace R-22, it is essential to have available a fluid having a high refrigerating capacity close to that of R-22.

The COP expresses the ratio of the refrigerating energy delivered to the energy applied to the compressor in order to compress the refrigerant in the vapor state. In the context of the substitution of R-22, a COP value of the refrigerant which is less than that of R-22 is suitable, if an increase in the consumption of electricity of the plant is accepted.

Finally, the condensation pressure indicates the stress exerted by the refrigerant on the corresponding mechanical parts of the refrigerating circuit. A refrigerant capable of replacing R-22 in a refrigeration system designed for the latter must not exhibit a condensation pressure significantly greater than that of R-22.

These novel HFC-based products, in particular R-407C, are not, however, compatible with the mineral oils or alkylbenzene oils used for systems operating with R-22 as regards the lubrication of mechanical parts, in particular because of an inadequate oil return. They thus require the use of novel oils of PolyOl Ester (POE) or PolyAlkylene Glycol (PAG) type.

The replacement, in the numerous existing heat transfer systems which were designed to operate with R-22, of the latter refrigerant by a refrigerant exhibiting a similar thermodynamic performance and an ozone depletion potential of zero thus requires, in addition to replacing the refrigerant, changing the lubricating oil, even changing certain components of the refrigerating circuit, such as the connecting pipe work and seals. Such a conversion procedure is virtually impossible with certain widely used items of compression equipment, such as the sealed compressor. It is in any case lengthy, difficult and expensive, all the more so as, in order to remove all the oil, it is necessary to rinse out several times with the new oil.

Furthermore, the document JP 8-100170 discloses a quaternary composition comprising difluoromethane, trifluoroethane, tetrafluoroethane and pentafluoroethane as replacement for R-502.

DETAILED DESCRIPTION OF THE INVENTION

Figure 1:
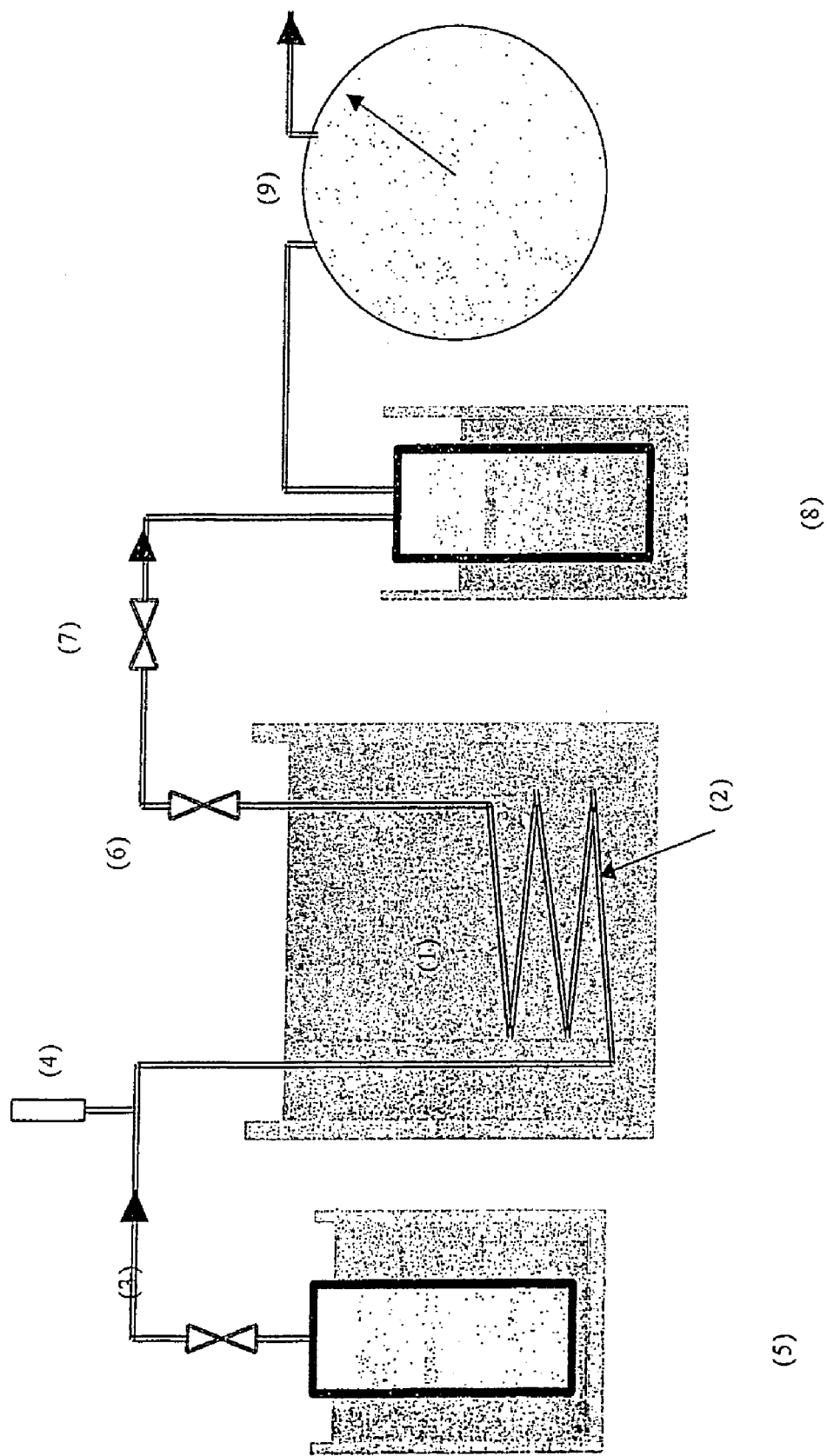
FIG. 1 is a schematic of a refrigeration circuit suitable for measuring oil return.

A subject matter of the present invention is a composition composed essentially of 15 to 35% by weight of R-32, of 10 to 50% by weight of R-125, of 30 to 50% by weight of R-134a and of 5 to 20% by weight of R-143a. A composition composed essentially of 15 to 30% by weight of R-32, of 20 to 40% by weight of R-125, of 35 to 50% by weight of R-134a and of 5 to 15% by weight of R-143a is preferred. R-143a denotes 1,1,1-trifluoroethane.

This composition can be substituted for R-22 in its various applications, in particular for air conditioning. It advantageously exhibits a thermodynamic performance which allows it to be substituted without disadvantage for R-22 in a heat transfer plant designed to operate with this refrigerant, making possible in particular a satisfactory oil return despite the presence of a residual amount of old mineral oil or alkylbenzene oil in the new oil of POE type after the rinsing (or cleaning) operation. Thus, the rinsing operation can be simplified.

The following specific compositions by weight are particularly advantageous:
R-32=25%, R-125=25%, R 134a=40% and R 143a=10%
R-32=20%, R-125=35%, R 134a=35% and R 143a=10%
R-32=20%, R-125=30%, R 134a=35% and R 143a=15%
R-32=15%, R-125=25%, R 134a=50% and R 143a=10%

The composition according to the invention can thus be used as refrigerant in a heat transfer system suitable for R-22 and comprising a POE or PAG oil as lubricant. The lubricant can comprise residual amounts of mineral oil or alkylbenzene oil resulting from the rinsing operation. Another subject matter of the present invention is this use.

The composition which is a subject matter of the present invention can be prepared by methods well known to a person skilled in the art, such as by mixing each of its components in the liquid state in the desired proportions.

Finally, a subject matter of the present invention is a heat transfer system suitable for R-22 and comprising, as refrigerant, the composition as defined above.

The lubricant employed in such a system is advantageously an oil of polyol ester type or polyalkylene glycol type.

The heat transfer systems are refrigeration systems, air conditioning systems or heat pumps. Air conditioning systems are particularly preferred.

The duration of the procedure for converting a heat transfer system suitable for R-22 can be considerably reduced when, prior to the use of the composition according to the invention, a rinsing solution comprising one or more propellant(s) A of nonflammable HFC type, advantageously chosen from R-134a, R-125 and R-227a (1,1,1,2,3,3,3-heptafluoropropane), and one or more compound(s) B, chosen from propane, butane, isobutane, propylene, trans-1,2-dichloroethylene, ethyl chloride, dimethyl ether or methoxymethane and carbon dioxide, is used to remove the old lubricating oil.

The rinsing solution preferably comprises from 80 to 99% by weight of propellant(s) A and from 1 to 20% by weight of compound(s) B. Advantageously, it comprises from 90 to 99% by weight of A and from 1 to 10% by weight of B.

The rinsing solution which is advantageously preferred comprises from 12 to 94% by weight of propellant(s) A, from 0.15% to 19% by weight of compound(s) B and from 5 to 85% by weight of POE or PAG oil.

The rinsing solution which is even more preferred comprises from 54 to 79% by weight of propellant(s) A, from 0.6 to 8% by weight of compound(s) B and from 20 to 40% by weight of POE or PAG oil.

The examples which follow are presented purely by way of illustration.

EXAMPLES

Various compositions according to the present invention were prepared and subjected to the following tests.

a) Oil Return

A charge of 10 g of a mixture of mineral oil (M) or alkylbenzene oil (AB) with a polyol ester (POE) oil is introduced into a refrigerated coil (1) placed in a cryostat (2) at 0° C.

This coil is connected upstream, via a pipe fitted with a shut-off valve (3) and a pressure sensor (4), to a cylinder (5) containing the composition according to the invention to be tested, equipped with a dip pipe and placed in a bath at 30° C.

The coil is extended downstream via a pipe fitted with a regulating valve (6) and with a shut-off valve (7) which arrives in the bottom part of a collecting cylinder (8) placed in a heat bath at 60° C. A pipe exiting from the top part of the collecting cylinder is fitted with a gas meter (9).

The circuit described in FIG. 1 is representative of a refrigerating circuit in the vicinity of the evaporator and the oil return test consists in measuring the fraction of the oil charge placed in the coil which is carried away by the refrigerant.

A stream of the composition according to the invention to be tested is circulated for 15 minutes, by initial opening of the shut-off valve (7) and then of the shut-off valve (3), through the circuit described above and in particular through the coil containing the oil charge at a flow rate of approximately 1 $m^3/h$, measured at ambient temperature and under 1 atmosphere.

At the end of the test, the amount of oil recovered in the cylinder (8) is weighed.

The degree of recovery or "oil return" (expressed as a percentage) is equal to the weight of the oil thus recovered divided by the weight of the oil charge placed initially in the coil. The maximum allowable level of mineral oil or alkylbenzene oil in a POE oil is defined as being that beyond which the oil return of the mixture is less than that of R-22 under the same conditions of the test.

b) Thermodynamic Performance

The performance of the composition according to the invention was evaluated on a refrigerating loop, the operating conditions of which are: an evaporation temperature of 0° C., a compressor intake temperature of 15° C., a condensation temperature of 40° C. and supercooling of the liquid at the condenser outlet of 5 K.

The contents of R-32, R-125, R-134a and R-143a of the various compositions prepared and their thermodynamic performances are collated in table 1. By way of reference, those for R-22 and R-407C are also shown. The oil return of R-407C, of the various compositions prepared and of R-22 for various mixtures of POE oil with an alkylbenzene oil (table 2) or a mineral oil (table 3) have been listed. It is possible, by extrapolation to an oil return equivalent to that in the presence of R-22, to obtain the maximum allowable level of alkylbenzene oil or mineral oil in the POE for the oil return not to be less than that in the presence of R-22 (table 4).

It is apparent that the compositions illustrated have a refrigerating capacity which is greater than that of R-407C and withstand higher maximum allowable levels of mineral oil or alkylbenzene oil than R-407C.

TABLE 1

| | Example No. | | | | |
|---|---|---|---|---|---|
| | 1 | 2 | 3 | 4 (R-22) | 5 (R-407C) |
| | Compositions (as % by weight) | | | | |
| R-32 | 25 | 20 | 20 | | 23 |
| R-125 | 25 | 35 | 30 | | 25 |

TABLE 1-continued

| | Example No. | | | | |
|---|---|---|---|---|---|
| | 1 | 2 | 3 | 4 (R-22) | 5 (R-407C) |
| R-134a | 40 | 35 | 35 | | 52 |
| R-143a | 10 | 10 | 15 | | |
| R-22 | | | | 100 | |
| Performance | | | | | |
| Refrigerating capacity (kJ/m$^3$) | 3614 | 3590 | 3597 | 3381 | 3350 |
| COP | 5.50 | 5.50 | 5.50 | 5.70 | 5.50 |
| Pcond (bar) | 17.40 | 17.47 | 17.50 | 15.4 | 15.9 |

TABLE 2

Oil return with mixture of POE and alkylbenzene oil as %

| | Content of AB oil in the mixture | | | |
|---|---|---|---|---|
| | 15% | 20% | 25% | 50% |
| R-22 | 100% | 100% | 100% | 100% |
| R-407C | 95.0 | 90.5 | 84.5 | 59.5 |
| Example 1 | 98.5 | 94.0 | 89.0 | 63.5 |
| Example 2 | 98.5 | 95.0 | 88.0 | 63.0 |
| Example 3 | 98.5 | 93.5 | 90.0 | 63.5 |

TABLE 3

Oil return with mixture of POE and mineral oil as %

| | Content of M oil in the mixture | | | |
|---|---|---|---|---|
| | 10% | 15% | 20% | 25% |
| R-22 | 100 | 100 | 100 | 100 |
| R-407C | 97.0 | 91.0 | 88.0 | 83.0 |
| Example 1 | 99.5 | 95.0 | 90.0 | 86.0 |
| Example 2 | 99.0 | 94.5 | 90.0 | 86.0 |
| Example 3 | 99.5 | 95.0 | 90.5 | 86.0 |

TABLE 4

Maximum level of M or AB oil

| | Example | | | |
|---|---|---|---|---|
| | 1 | 2 | 3 | R-407C |
| M oil | 9.3% | 8.8% | 9.3% | 6.2% |
| AB oil | 13.8% | 14.0% | 14.0% | 10.1% |

M oil: Suniso 3 GS
AB oil: Barelf AL55
POE oil: Planetelf ACD 32

Example 6

The procedure is the same as for the preceding examples except that the composition according to the invention comprises 15% by weight of R-32, 25% by weight of R-125, 50% by weight of R-134a and 10% by weight of R-143a.

The refrigerating capacity of such a composition is 3240 kJ/m$^3$, the COP is 5.6 and the condensation pressure is 15.5 bar.

The maximum allowable level of mineral oil is 10.7% and that of the alkylbenzene is 14%.

Example 7 (Comparative)

The procedure is the same as above but with a composition comprising 20% by weight of R-32, 45% by weight of R-125, 15% by weight of R-134a and 20% by weight of R-143a.

The refrigerating capacity of such a composition is 3950 kJ/m$^3$, the COP is 5.3 and the condensation pressure is 19.7 bar.

The maximum allowable level of mineral oil is 7.3% and that of the alkylbenzene is 14%.

What is claimed is:

1. A composition consisting essentially of 15 to 25% by weight of R-32, of 25 to 35% by weight of R-125, of 35 to 50% by weight of R-134a and of 10 to 15% by weight of R-143a.

2. A refrigerant, comprising a composition as claimed in claim 1.

3. A heat transfer system, containing the refrigerant as claimed in claim 2.

4. A process for the conversion of a heat transfer system suitable for R-22 to the use of a composition as claimed in claim 1, comprising removing R-22 from said heat transfer system, rinsing said heat transfer system with a rinsing composition comprising one or more propellant(s) A of nonflammable HFC type and one or more compound(s) B chosen from propane, butane, isobutane, propylene, trans-1,2-dichloroethylene, ethyl chloride, dimethyl ether, methoxymethane and carbon dioxide or mixtures thereof prior to adding a composition as claimed in claim 1.

5. The conversion process as claimed in claim 4, characterized in that said rinsing solution comprises from 80 to 99%, by weight of propellant(s) A and from 1 to 20%, by weight of compound(s) B.

6. The conversion process as claimed in claim 4, characterized in that said rinsing solution comprising from 12 to 94%, by weight of propellant(s) A, from 0.15% to 19%, by weight of compound(s) B and from 5 to 85%, by weight of POE or PAG oil.

7. The conversion process of claim 5, characterized in that said rinsing solution comprised from 90 to 99% by weight of propellant(s) A and from 1 to 10% by weight of compound(s) B.

8. The conversion process of claim 6, characterized in that said rinsing solution comprises from 54 to 79% by weight of propellant(s) A, from 0.6 to 8% by weigh of compound(s) B and from 20 to 40% by weight of POE or PAG oil.

* * * * *